(12) United States Patent
Nakashima et al.

(10) Patent No.: US 9,115,784 B2
(45) Date of Patent: Aug. 25, 2015

(54) TRANSMISSION BELT

(75) Inventors: Hisayuki Nakashima, Kobe (JP);
Shigeki Okuno, Kobe (JP)

(73) Assignee: Bando Chemical Industries, Ltd., Hyogo (JP)

(*) Notice: Subject to any disclaimer, the term of this patent is extended or adjusted under 35 U.S.C. 154(b) by 1274 days.

(21) Appl. No.: 12/281,700

(22) PCT Filed: Feb. 21, 2007

(86) PCT No.: PCT/JP2007/053132
§ 371 (c)(1),
(2), (4) Date: Sep. 4, 2008

(87) PCT Pub. No.: WO2007/102310
PCT Pub. Date: Sep. 13, 2007

(65) Prior Publication Data
US 2009/0011884 A1 Jan. 8, 2009

(30) Foreign Application Priority Data
Mar. 7, 2006 (JP) ................................. 2006-060935

(51) Int. Cl.
*F16G 5/20* (2006.01)
*B29D 29/10* (2006.01)

(52) U.S. Cl.
CPC ................ *F16G 5/20* (2013.01); *B29D 29/103* (2013.01)

(58) Field of Classification Search
USPC .............. 525/333.8, 232; 474/205, 266, 237, 474/250, 264, 271
See application file for complete search history.

(56) References Cited

U.S. PATENT DOCUMENTS

| 6,251,977 B1 | 6/2001 | Georget et al. | |
| 6,511,394 B2 * | 1/2003 | Okuno et al. | 474/260 |
| 6,616,558 B2 * | 9/2003 | South | 474/260 |

FOREIGN PATENT DOCUMENTS

| JP | 57204351 | | 12/1982 |
| JP | 110513 Y2 | | 3/1989 |
| JP | 8244134 | | 9/1996 |
| JP | 10103413 | | 4/1998 |
| JP | 10103417 | | 4/1998 |
| JP | 11-349752 | * | 12/1999 |
| JP | 200026674 A | | 1/2000 |
| JP | 2004507679 | | 3/2004 |
| JP | 200638214 | | 2/2006 |
| JP | 2006-064174 | * | 3/2006 |
| JP | 2006-153059 | * | 6/2006 |
| WO | 2007018148 A1 | | 2/2007 |

* cited by examiner

*Primary Examiner* — Monique Peets
(74) *Attorney, Agent, or Firm* — The Webb Law Firm (57) ABSTRACT

The invention provides a transmission belt that can suppress lowering in transmission efficiency and has improved durability. A rubber layer adhered to core wires is formed to have a durometer hardness (shore A) of not less than 72 and not more than 85, or have a tensile stress of not less than 0.5 MPa and not more than 1.7 MPa when stretched 10% in the belt longitudinal direction at 25° C., and the rubber layer is formed to have a weight increase of 90% or less after immersed in light oil for 48 hours at 25° C. or have a weight increase of 80% or less after immersed in toluene for 48 hours at 25° C. Alternatively, the rubber layer adhered to the core wires is formed to have a storage modulus of not less than 10 MPa and not more than 50 MPa and a tan δ of not more than 0.15 as measured by dynamic viscoelasticity measurement under conditions at a static load of 3 kgf/cm², a dynamic strain of 0.4%, a frequency of 10 Hz and a temperature of 25° C. in a tensile mode in a belt longitudinal direction.

4 Claims, 1 Drawing Sheet

TRANSMISSION BELT

FIELD OF THE INVENTION

The present invention relates to a transmission belt that includes a rubber layer that has ethylene-α-olefin elastomer used as a base rubber and extends in a belt longitudinal direction, and core wires adhered to the rubber layer and embedded therein in the belt longitudinal direction, and particularly to a transmission belt for which high load transmission is required.

BACKGROUND OF THE INVENTION

Transmission belts are hitherto widely used as a means of transmitting power from a driving side to a driven side, and in these days, synchronous belts, V-belts, V-ribbed belts and the like for automobiles or general industries are required to have a high load transmission capability.

In addition, a system or device has been highly integrated and hence reduced in size to meet the recent demand of saving the space, and specifically pulleys around which a transmission belt is wound are reduced in diameter, which in turn requires the transmission belt to be tolerable against large stress and strain.

Furthermore, the reduction in size of the system or device causes heating parts to be tightly packed in the system or device, which in turn causes the transmission belt to be heated to a temperature higher than ever. Thus, there is a demand for a transmission belt that is more compatible for high temperature use.

Meanwhile, for transmission belts, those having a high tensile member called as core wires embedded therein are widely used to impart tensile strength in a power transmission direction (belt longitudinal direction).

For example, in a V-ribbed belt or the like, these core wires are disposed outside of a compression rubber layer which enables frictional power transmission relative to a pulley and inside of a back-side rubber layer which acts as an outermost layer of the transmission belt.

The core wires are, for example, adhered to a rubber layer called as an adhesive rubber layer formed to have an elastic modulus generally lower than that of the compression rubber layer, and are embedded therein.

In order to satisfy high load transmission capability, strength tolerable against large stress and strain, and heat resistance compatible for high temperature use required for transmission belts, studies are recently under way to use materials having improved heat resistance, cold resistance, frictional resistance, resistance to bending deteriorates and the like for constitutional elements, such as a compression rubber layer, an adhesive rubber layer, core wires, a back-side rubber layer, and sometimes ethylene-α-olefin elastomer is sometimes used for a rubber layer of a transmission belt since it is excellent in heat resistance and cold resistance, and is obtainable at low cost and is compatible for halogen free.

For example, ethylene-propylene-diene-terpolymer (hereinafter referred also as "EPDM") or the like is used by being crosslinked by an organic peroxide.

For core wires, polyester fibers, aramid fibers, polyamide fibers or the like which are excellent in heat resistance and mechanical strength are generally used.

In order to further provide satisfied characteristics required for a transmission belt, such as high load transmission capability, mechanical strength compatible for large stress and strain, and heat resistance compatible for high temperature use, it is critical not only to use materials having improved heat resistance, cold resistance, frictional resistance, resistance to bending deteriorates for those constitutional elements, but also to improve durability of an interface between the respective constitutional elements.

Among them, it is especially critical to improve the durability of an interface between a rubber layer, such as an adhesive rubber layer to be adhered to core wires, and core wires.

The aforesaid ethylene-α-olefin elastomer, such as EPDM, usually has a lesser polarity and a lower adhesiveness than other rubbers.

Therefore, cracks may take place in an adhesive interface between a compression rubber layer and an adhesive rubber layer, or between core wires and these rubber layers in a transmission belt having a rubber layer made of ethylene-α-olefin elastomer.

An adhesive rubber layer is generally formed by using a soft rubber having such a high fluidity as to be able to be fluidized when heat pressing in molding a transmission belt and hence be securely and tightly adhered to core wires.

On the other hand, a compression rubber layer is generally formed by mixing short fibers in a rubber to have an elastic modulus much higher than that of the adhesive rubber layer from the viewpoint of preventing deformation and improving power transmission capability, of a transmission belt.

Therefore, cracks or the like are likely to take place in an adhesive interface between a compression rubber layer and an adhesive rubber layer, or between core wires and these rubber layers. In order to suppress these cracks or the like, Patent Documents 1, 2 propose that short fibers or carbon black is mixed in a rubber to have an adhesive rubber layer having a higher modulus than ever.

Patent Document 3 proposes that core wires are disposed in an interface between the compression rubber layer and the adhesive rubber layer, and the core wires are adhered to both the rubber layers, namely the compression rubber layer and the adhesive rubber layer, and the resulting product is used for a transmission belt.

Patent Document 4 proposes that an adhesive rubber layer is formed by using a rubber exhibiting a high modulus at a high temperature.

However, when core wires are adhered to a rubber layer having a high modulus in the manner as proposed in those Patent Documents, the rubber layer having a high modulus to be adhered to core wires itself may cause cracks therein.

Also, when the adhesive rubber layer is formed with a high modulus in the manner as proposed in the Patent Documents 1, 2, a problem of dynamic heat build-up of an adhesive rubber layer having such a high modulus may become significant in an actual use in which it is wound around, for example, pulley having small diameter.

Furthermore, when an adhesive rubber layer is formed with a high modulus in the manner as proposed in the Patent Documents, 1, 2, a transmission belt has a high flexural rigidity and hence causes a large hysteresis loss due to the repeated bending. Therefore, a large energy loss is caused in operation and the transmission efficiency may be lowered.

Patent Document 5 proposes that a chlorosulfonated polyethylene or hydrogenated nitrile rubber is used between a rubber layer, for which EPDM is used, and core wires. However, the adhesiveness is not satisfactorily improved in actual and therefore its proposal is hardly practicable.

Specifically, a transmission belt in which a rubber layer is formed by using ethylene-α-olefin elastomer as a base rubber, and this rubber layer and core wires are adhered to each other, has a problem that the durability of the transmission belt is improved while suppressing lowering of a transmission efficiency.

Patent Document 1: Japanese Examined Utility Model Application Publication No. Hei-1-10513

Patent Document 2: Japanese Unexamined Patent Application Publication No. Hei-10-103413

Patent Document 3: Japanese Unexamined Patent Application Publication No. Sho-57-204351

Patent Document 4: Published Japanese Translation of PCT International Application (Tokuhyo) No. 2004-507679

Patent Document 5: Japanese Unexamined Patent Application Publication No. Hei-10-103417

SUMMARY OF THE INVENTION

Problems to be Solved by the Invention

According to the present invention, it is an object of the present invention to provide a transmission belt that realizes suppression of deterioration of transmission efficiency and has an improved durability.

Means of Solving the Problems

The present inventors found that it is possible to suppress deterioration of transmission efficiency of a transmission belt while improving the durability by allowing a rubber layer with core wires adhered thereto to have specific physical characteristics, and thus achieved the present invention.

Specifically, according to the present invention which has been conceived to solve the above problems, there is provided a transmission belt that includes a rubber layer that has ethylene-α-olefin elastomer used as a base rubber and extends in a belt longitudinal direction, and core wires adhered to the rubber layer and embedded therein in the belt longitudinal direction, characterized in that the rubber layer adhered to the core wires is formed to have a durometer hardness (shore A) of not less than 72 and not more than 85, or have a tensile stress of not less than 0.5 MPa and not more than 1.7 MPa when stretched 10% in the belt longitudinal direction at 25° C., and the rubber layer is formed to have a weight increase of 90% or less after immersed for 48 hours in light oil at 25° C. or have a weight increase of 80% or less after immersed in toluene at 25° C.

By the base rubber is herein meant a rubber used for 50% or more of rubber components used in a rubber layer.

By the durometer hardness (shore A) is herein meant a value measured according to JIS K 6253, and by the tensile stress when stretched 10% is meant a value obtained by measuring the stress when the distance between the marked lines has been elongated 10% in a tensile test conducted based on JIS K 6251.

According to another aspect of the present invention, there is provided a transmission belt that includes a rubber layer that has ethylene-α-olefin elastomer used as a base rubber and extends in a belt longitudinal direction, and core wires adhered to the rubber layer and embedded therein in the belt longitudinal direction, characterized in that the rubber layer adhered to the core wires is formed to have a storage modulus of not less than 10 MPa and not more than 50 MPa and a tan δ of not more than 0.15 as measured by dynamic viscoelasticity measurement under conditions at a static load of 3 kgf/cm², a dynamic strain of 0.4%, a frequency of 10 Hz and a temperature of 25° C. in a tensile mode in a belt longitudinal direction.

According to still another aspect of the present invention, there is provided a method of manufacturing a transmission belt that includes a rubber layer that has ethylene-α-olefin elastomer used as a base rubber, is crosslinked by an organic peroxide and extends in a belt longitudinal direction, and core wires adhered to the rubber layer and embedded therein in the belt longitudinal direction, characterized in that the method includes forming the rubber layer to be adhered to the core wires to have a durometer hardness (shore A) of not less than 72 and not more than 85, or have a tensile stress of not less than 0.5 MPa and not more than 1.7 MPa when stretched 10% in the belt longitudinal direction at 25° C.; and crosslinking the rubber layer by mixing an organic peroxide with a rubber component used in the rubber layer to have effective peroxide groups of the organic peroxide being not less than 0.021 mol or more per 100 g of a rubber component of the rubber layer, thereby forming the rubber layer to be adhered to the core wires to have a weight increase of 90% or less after immersed in light oil for 48 hours at 25° C. or have a weight increase of 80% or less after immersed in toluene for 48 hours at 25° C.

By the effective peroxide groups is herein meant peroxide groups which can be cleaved when they can be used for crosslinking, of peroxide groups in a molecule of the organic peroxide. By having effective peroxide groups of the organic peroxide being not less than 0.021 mol per 100 g of a rubber component is herein meant that a numerical value, which is obtained by dividing the quantity of an organic peroxide mixed per 100 g of a rubber component by the molecular mass of the organic peroxide and then multiplying it by the effective peroxide groups in a molecule of an organic peroxide, is 0.021 or more.

According to yet another aspect of the present invention, there is provided a method of manufacturing a transmission belt that includes a rubber layer that has ethylene-α-olefin elastomer used as a base rubber, is crosslinked by an organic peroxide and extends in a belt longitudinal direction of the belt, and core wires adhered to the rubber layer and embedded therein in the belt longitudinal direction, characterized in that the method includes crosslinking the rubber layer by mixing the organic peroxide with a rubber component used in the rubber layer to have effective peroxide groups of the organic peroxide being not less than 0.021 mol or more per 100 g of the rubber component, thereby forming the rubber layer to be adhered to the core wires to have a storage modulus of not less than 10 MPa and not more than 50 MPa and a tan δ of not more than 0.15 as measured by dynamic viscoelasticity measurement under conditions at a static load of 3 kgf/cm², a dynamic strain of 0.4%, a frequency of 10 Hz and a temperature of 25° C. in a tensile mode in the belt longitudinal direction.

Advantage of the Invention

According to the present invention, the rubber layer to be adhered to the core wires is formed to have a durometer hardness (shore A) of not less than 72 and not more than 85, or have a tensile stress of not less than 0.5 MPa and not more than 1.7 MPa when stretched 10% in the belt longitudinal direction at 25° C., it is possible to reduce hysteresis loss or the like as compared with the case in which the rubber layer to be adhered to the core wires has a high modulus, and suppress deterioration of the transmission efficiency.

In addition, since the rubber layer to be adhered to the core wires has ethylene-α-olefin elastomer used as the base rubber, it is possible to improve heat resistance and cold resistance of the rubber layer itself and hence improve durability of the transmission belt.

Furthermore, since the rubber layer adhered to the core wires is formed to have a durometer hardness (shore A) of not less than 72 and not more than 85, or have a tensile stress of not less than 0.5 MPa and not more than 1.7 MPa when stretched 10% in the belt longitudinal direction at 25° C., and the rubber layer is formed to have a weight increase of 90% or less after immersed in light oil for 48 hours at 25° C. or have a weight increase of 80% or less after immersed in toluene for 48 hours at 25° C., it is possible to reduce dynamic heat build-up during belt running, and hence reduce separation or pop-out.

That is, it is possible to reduce deterioration of the transmission efficiency of a transmission belt while at the same time improve the durability.

The fact that this rubber layer is formed to have a weight increase of 90% or less after immersed in light oil for 48 hours at 25° C. or have a weight increase of 80% or less after immersed in toluene at 25° C. can be confirmed by taking out the rubber layer adhered to the core wires from the transmission belt, then removing the core wires, then immersing this in light oil or toluene of such an amount as to satisfactorily swell the rubber layer, and then measuring the weight change before and after immersion.

For example, the initial weight ($M_0$) before immersion can be determined by taking out a small piece of rubber having a thickness of about 0.1 mm from the transmission belt to have about 50 mg in total, and then weighing it by an electronic balance having a minimum measuring unit of about 0.1 mg.

The rubber specimen whose initial weight has been weighed is surrounded by, for example, brass mesh having an opening size of 50 μm to have a measuring specimen. This measuring specimen is immersed in light oil or toluene for 48 hours at 25° C. so that it can be swelled by light oil or toluene to have its weight increased.

The weight ($M_1$) of the swelled rubber specimen, which has been swelled by light oil or toluene and has its weight increased, can be determined by taking out this swelled rubber specimen from light oil or toluene, then placing it on a filter paper, then leaving it for 30 minutes under an environment at a temperature of 23±2° C. and a relative humidity of 60±5%, and then measuring its weight in the same manner as that in measuring the initial weight as described above.

Then, this weight measuring is carried out, for example, 5 times to have 5 numerical values of $\Delta M$ in the following formula and the medium value thereof is calculated, so that this medium value can be determined as weight increase after 48 hours immersion in light oil or toluene.

$$\Delta M(\%) = (M_1 - M_0)/M_0 \times 100$$

When the rubber layer which has been adhered to the core wires is formed to have a storage modulus of not less than 10 MPa and not more than 50 MPa as measured by dynamic viscoelasticity measurement under conditions at a static load of 3 kgf/cm², a dynamic strain of 0.4%, a frequency of 10 Hz and a temperature of 25° C. in a tensile mode in a belt longitudinal direction, it is possible to reduce hysteresis loss or the like as compared with the case in which the rubber layer is formed with a high modulus, and suppress deterioration of the transmission efficiency.

Furthermore, since a tan δ is not more than 0.15 as measured by dynamic viscoelasticity measurement under conditions at a static load of 3 kgf/cm², a dynamic strain of 0.4%, a frequency of 10 Hz and a temperature of 25° C., it is possible to reduce dynamic heat build-up, and hence reduce cracks and separation due to the cracks or the like problem.

Since ethylene-α-olefin elastomer is used as a base rubber in the rubber layer to be adhered to the core wires, it is possible to improve heat resistance and cold resistance of the rubber layer itself and hence improve durability of the transmission belt.

That is, it is possible to improve the durability while at the same time reduce deterioration of the transmission efficiency of the transmission belt.

The transmission belt includes the rubber layer that has ethylene-α-olefin elastomer used as a base rubber, is crosslinked by an organic peroxide and extends in the belt longitudinal direction, and the core wires adhered to the rubber layer and embedded therein in the belt longitudinal direction. This rubber layer is crosslinked by mixing an organic peroxide with a rubber component used in the rubber layer to have effective peroxide groups of the organic peroxide being not less than 0.021 mol or more per 100 g of the rubber component. With this arrangement, it is possible to easily form the rubber layer adhered to the core wires to have a durometer hardness (shore A) of not less 72 and not more than 85, or have a tensile stress of not less than 0.5 MPa and not more than 1.7 MPa when stretched 10% in the belt longitudinal direction at 25° C., or to have a weight increase of 90% or less after immersed in light oil for 48 hours at 25° C. or have a weight increase of 80% or less after immersed in toluene for 48 hours at 25° C.

Accordingly, it is possible to easily manufacture a transmission belt that realizes suppression of deterioration of transmission efficiency and has improved durability.

The transmission belt includes the rubber layer that has ethylene-α-olefin elastomer used as a base rubber, is crosslinked by an organic peroxide and extends in the belt longitudinal direction, and the core wires adhered to the rubber layer and embedded therein in the belt longitudinal direction. This rubber layer is crosslinked by mixing an organic peroxide with a rubber component used in the rubber layer to have effective peroxide groups of the organic peroxide being not less than 0.021 mol or more per 100 g of the rubber component. With this arrangement, it is possible to easily form the rubber layer to be adhered to the core wires to have a storage modulus of not less than 10 MPa and not more than 50 MPa and a tan δ of not more than 0.15 as measured by dynamic viscoelasticity measurement under conditions at a static load of 3 kgf/cm², a dynamic strain of 0.4%, a frequency of 10 Hz and a temperature of 25° C. in a tensile mode in the belt longitudinal direction.

Accordingly, it is possible to easily manufacture a transmission belt that realizes suppression of deterioration of transmission efficiency and has improved durability.

DESCRIPTION OF THE REFERENCE CODES

1: transmission belt
2: back-side rubber layer
3: adhesive rubber layer
4: core wires
5: compression rubber layer

BEST MODE FOR CARRYING OUT THE INVENTION

The description will be herein made for a preferred embodiment of the present invention by taking, for example, a V-ribbed belt as a transmission belt with reference to the attached drawings.

Now, the description will be made for a first embodiment.

Figure 1:
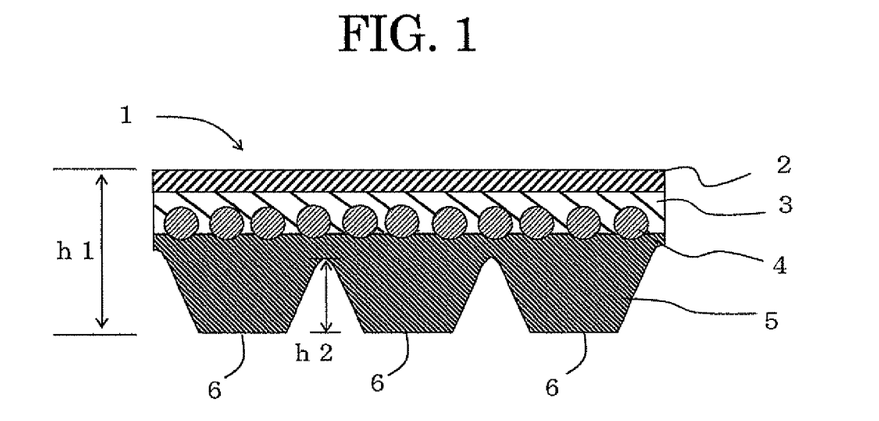
FIG. 1 is a cross sectional view illustrating a transmission belt of one embodiment.

A V-ribbed belt of this embodiment is formed into an endless belt. Ribs 6 each formed into a trapezoidal shape having a cross section that becomes narrower towards the inner circumference of the belt are provided on the inner circumferential side of the belt in plural lines aligned in the belt width direction.

On the inner circumferential side of the V-ribbed belt 1, that is, on the power transmission surface side that contacts pulleys is formed a compression rubber layer 5 as a rubber layer having the ribs 6. As a rubber layer on the outer circumferential side of this compression rubber layer 5, an adhesive rubber layer 3 is formed. As a rubber layer on the outer circumferential side of the adhesive rubber layer 3, a back-side rubber layer 2 is formed as an outermost layer of the V-ribbed belt 1.

The compression rubber layer 5, the adhesive rubber layer 3 and the back-side rubber layer 2 of the V-ribbed belt 1 are continuously formed in the belt longitudinal direction.

Plural core wires are adhered to a rubber of the adhesive rubber layer 3 and embedded in the adhesive rubber layer 3 at a given interval in the width direction of the V-ribbed belt 1.

The back-side rubber layer 2 is formed by using a rubber sheet.

The adhesive rubber layer is formed by using ethylene-α-olefin elastomer as a base rubber thereof, and is crosslinked with an organic peroxide.

For forming this adhesive rubber layer 3, in addition to a rubber component having the ethylene-α-olefin elastomer used as its base rubber and an organic peroxide, blended ingredients, such as carbon black, inorganic fillers, short fibers or the like, are used.

As carbon black used for this adhesive rubber layer 3, those generally used for a rubber of a transmission belt are used without specific limitation. For example, it is possible to use carbon black called such as furnace black, channel black, thermal black or acetylene black.

The amount of carbon used for this adhesive rubber layer 3 depends on the mixed amount of the other inorganic filler, short fibers or the like, or the kind of the ethylene-α-olefin elastomer, with which they are mixed. However, for example, when carbon black generally called as FEF is used, it is preferable to have 80 parts by weight or less relative to 100 parts by weight of a rubber component having ethylene-α-olefin elastomer used as a base.

As an inorganic filler used for this adhesive rubber layer 3, those generally used for a rubber of a transmission belt can be used without a specific limitation. For example, silica, calcium carbonate or talc can be used.

Examples of the short fibers used for the adhesive rubber layer 3 include polyester fibers, polyvinyl alcohol fibers, polyamide fibers, cotton fibers, silk fibers, linen fibers, wool fibers, cellulose fibers, aromatic polyamide fibers, wholly aromatic polyester fibers, poly(para-phenylenebenzobisoxazole) fibers, carbon fibers, polyketone fibers, and basaltic fibers. Among them, it is preferable to use polyamide fibers, cotton fibers, aromatic polyamide fibers and polyvinyl alcohol fibers.

As ethylene-α-olefin elastomer used for the adhesive rubber layer 3, it is possible to use, for example, ethylene-propylene copolymer, ethylene-propylene-diene terpolymer, ethylene-octene copolymer, and ethylene-butene copolymer. Among them, ethylene-propylene-diene-terpolymer is suitable from the viewpoints of low cost, excellent processability, and high crosslinking efficiency.

As a diene component of this ethylene-propylene-diene-terpolymer, it is possible to use straight chain diene, such as 1,4-hexadiene, 1,5-hexadiene, 1,7-oxtadiene, 1,9-decadiene and 1,6-octadiene, branched straight-chain diene, such as 5-methyl-1,4-hexadiene, 3,7-dimethyl-1,6-oxtadiene, and 3,7-dimethyl-1,7-oxtadiene, monocyclic alicyclic diene, such as 1,3-cyclopentadiene, 1,4-cyclohexadiene, 1,5-cyclooxtadiene, and 1,5-cyclododecadiene, polycyclic alicyclic diene, such as cycloalkenyl or cycloalkyliden-norbornene, such as tetrahydroindene, methyltetrahydroindene, dicyclopentadiene, bicycle(2,2,1)-hepta-2,5-diene, alkenyl, alkylidene, 5-methylene-2-norbornene, 5-propenyl-2-norbornene, 5-isopropylidene-2-norobornene, 5-(4-cyclopentenyl)-2-norbornene, 5-cyclohexycylidene-2-norbornene, and 5-vinyl-2-norbornene, and norbornadiene, such as 5-ethylidene-2-norbornene. Among them, dicyclopentadiene realizes excellent adhesive durability to other rubber layers.

This ethylene-α-olefin elastomer is used for 50% by weight of the entire rubber components, and other rubber components, such as a natural rubber, a stylene-butadiene copolymer rubber, a chloroprene rubber, a hydrogenated nitrile-butadiene rubber, an alkylated chlorosulfonated polyethylene rubber, an isoprene rubber, an epichlorohydrin rubber, a butyl rubber or an acryl rubber may be added to such an extent as not to deteriorate the advantages of the present invention, according to needs and circumstances.

An organic peroxide is used for crosslinking of this ethylene-propylene-diene-terpolymer (or a mixed rubber with a different rubber).

Examples of this organic peroxide that can be used include di-t-butylperoxide, dicumylperoxide, t-butylcumylperoxide, 1,1-t-butylperoxy-3,3,5-trimethylcyclohexane, 2,5-dimethyl-2,5-di(t-butylperoxy)hexane, 2,5-dimethyl-2,5-di(t-butylperoxy)hexane-3, bis(t-butylperoxy-diisopropyl)benzene, 2,5-dimethyl-2,5-di(benzoylperoxy)hexane, t-butylperoxy benzoate, and t-butylperoxy-2-ethylhexyl carbonate.

According to needs and circumstances, a crosslinking auxiliary agent may be used along with a crosslinking agent for which an organic perixoide is used. Examples of the crosslinking auxiliary agent that can be used include triallylisocyanurate, triallylcyanurate, 1,2-polybutadiene, a metallic salt of an unsaturated carboxylic acid, oxime, guanidine, trimethylolpropane trimethacrylate, ethylene glycol dimethacrylate, and N—N'-m-phenylenebismaleimide.

It is possible to mix an age resistor, an antiscorching agent, a plasticizer, a processing material, a colorant or a fire retardant into the mixed ingredients of the adhesive rubber layer 3.

The adhesive rubber layer 3 having these ingredients mixed together is formed to have a durometer hardness (shore A) of not less than 72 and not more than 85, or have a tensile stress of not less than 0.5 MPa and not more than 1.7 MPa when stretched 10% in the belt longitudinal direction at 25° C. as measured after the transmission belt has been formed.

Also, the adhesive rubber layer 3 is formed to have a weight increase of 90% or less after immersed in light oil for 48 hours at 25° C. or have a weight increase of 80% or less after immersed in toluene for 48 hours at 25° C. as measured after the transmission belt has been formed.

A reason why the adhesive rubber layer 3 is formed to have a durometer hardness (shore A) of not less than 72 and not more than 85, or have a tensile stress of not less than 0.5 MPa and not more than 1.7 MPa when stretched 10% in the belt longitudinal direction at 25° C. is that when the adhesive rubber layer to be adhered to the core wires is formed to have a value exceeding the above range, the dynamic heat build-up becomes large and hence cracks or separation due to the cracks may take place during the operation of the transmission belt.

On the other hand, when the adhesive rubber layer is formed to have a value smaller than the above range, shear deformation of the adhesive rubber layer becomes large and hence separation takes place.

A reason why the adhesive rubber layer is formed to have a weight increase of 90% or less after immersed for 48 hours in light oil at 25° C. or have a weight increase of 80% or less after immersed for 48 hours in toluene at 25° C. is that when the adhesive rubber layer to be adhered to the core wires is formed to have a value out of the above range, cracks or separation due to the cracks may take place during the operation of the transmission belt.

The compression rubber layer 5 and the back-side rubber layer 2 each may be formed by using the same composition as that used for the adhesive rubber layer 3, and it is possible to form each of them by using a composition having a different formulation in order to give a function required for each of them, if necessary.

From the viewpoint of being capable of securely enhancing the adhesive power between the respective layers, it is preferable to form all the layers by using a composition having ethylene-α-olefin elastomer used as a base rubber.

When the adhesive rubber layer is crosslinked by an organic peroxide, it is possible to crosslink each of the compression rubber layer 5 and the back-side rubber layer 2 by the other cross linking system other than an organic peroxide, such as sulfur crosslinking or resin crosslinking.

The back-side rubber layer 2 may be formed by a rubber sheet, and in place of the rubber sheet, a rubber coated canvas may be used. For a rubber sheet of this back-side rubber layer, and rubber and canvas for a rubber coated canvas, rubbers and canvas generally used for a transmission belt may be used.

For example, the back-side rubber layer 2 may be formed by a rubber sheet using the same mixed ingredients as those of each of the compression rubber layer and the adhesive rubber layer.

As core wires adhered to the adhesive rubber layer and embedded therein, it is possible to use, for example, polyester fibers (polyethylene terephthalate fibers, polyethylene naphthalate fibers, etc.), polyamide fibers (6,6 nylon fibers, 6 nylon fibers, 4,6 nylon fibers, etc.), aromatic polyamide fibers (aramid fibers), wholly aromatic polyester fibers (polyarylate fibers), poly(para-phenylenebenzobisoxazole) fibers, carbon fibers, polyketone fibers, basaltic fibers, and glass fibers.

Especially, polyester fibers, polyamide fibers and aromatic polyamide fibers are suitable.

Furthermore, for the core wires made of these materials, those subjected to pretreatment by isocyanate or epoxy and a resorcin-formaldehyde-latex treatment (hereinafter referred also as a "RFL treatment") may be used, and those overcoated with a rubber cement may also be used, if necessary.

The respective mixing ingredients used for a rubber composition of a compression rubber layer, an adhesive rubber layer and a back-side rubber layer may be kneaded by a kneading means generally used for rubber, such as a kneader, a Banbury mixer, a roll and a biaxial kneader.

An unvulcanized rubber composition kneaded by this kneading means is formed into a sheet by a sheeting means, such as a calendar roll, and a V-ribbed belt is manufactured by using the sheet.

For example, calendar roll sheets are wound around a cylindrical die and laminated to each other so that the back-side rubber layer and the compression rubber layer are oriented to allow a grain direction of a calendar roll to become the width direction (a direction orthogonal to the longitudinal direction) of the transmission belt, and the adhesive rubber layer is oriented to allow a grain direction of a calendar roll to become the longitudinal direction of the transmission belt. Whereby, a laminate body of a rubber sheet of the back-side rubber layer, a rubber and core wires of the adhesive rubber layer, a rubber of the compression rubber layer and the like is formed around the cylindrical die; then the laminate body is integrated by crosslinking by using a vulcanizing pan or the like to form a cylindrical premold; then given ribs are formed on this premold by using a grind stone or the like; and then a V-ribbed belt with a given number of ribs is cut from the premold.

At this moment, the adhesive rubber layer to which core wires are adhered is crosslinked by mixing therein an organic peroxide to have effective peroxide groups of the organic peroxide being 0.021 mol or more per 100 g of a rubber component. With this, it is possible to easily form an adhesive rubber layer to have a durometer hardness (shore A) of not less than 72 and not more than 85, or have a tensile stress of not less than 0.5 MPa and not more than 1.7 MPa when stretched 10% in the belt longitudinal direction at 25° C., and in addition, easily form a rubber layer to be adhered to the core wires to have a weight increase of 90% or less after immersed in light oil for 48 hours at 25° C. or have a weight increase of 80% or less after immersed in toluene for 48 hours at 25° C.

Short fibers are contained in the adhesive rubber layer generally in the amount of 20 parts by weight or less per 100 parts by weight of a rubber component of the adhesive rubber layer. With this, it is possible to more easily form an adhesive rubber layer to have a durometer hardness (shore A) of not less than 72 and not more than 85, or have a tensile stress of not less than 0.5 MPa and not more than 1.7 MPa when stretched 10% in the belt longitudinal direction at 25° C., and in addition, more easily form an adhesive rubber layer to have a weight increase of 90% or less after immersed in light oil for 48 hours at 25° C. or have a weight increase of 80% or less after immersed in toluene for 48 hours at 25° C. From these points of view, the short fibers are contained preferably in the amount of 1-10 parts by weight per 100 parts by weight of a rubber component contained in the adhesive rubber layer.

Now, the description will be made for a second embodiment of a V-ribbed belt as the transmission belt.

The V-ribbed belt of the second embodiment is the same as that of the first embodiment in each of the structural elements, such as a compression rubber layer, an adhesive rubber layer, core wires, and a back-side rubber layer, and also is the same as the first embodiment in the mixed ingredients used for each of the structural elements.

The V-ribbed belt of the second embodiment is different from the V-ribbed belt of the first embodiment in that an adhesive rubber layer to which core wires are adhered is formed to have a storage modulus of not less than 10 MPa and not more than 50 MPa and a tan δ of not more than 0.15 as measured by dynamic viscoelasticity measurement under conditions at a static load of 3 kgf/cm$^2$, a dynamic strain of 0.4%, a frequency of 10 Hz and a temperature of 25° C. in a tensile mode in the belt longitudinal direction.

That is, according to the V-ribbed belt of the first embodiment, the adhesive rubber layer to be adhered to the core wires is formed to have a durometer hardness (shore A) of not less than 72 and not more than 85, or have a tensile stress of not less than 0.5 MPa and not more than 1.7 MPa when stretched 10% in the belt longitudinal direction at 25° C., thereby reducing hysteresis loss or the like as compared with the case in which the rubber layer to be adhered to the core wires is formed with a high modulus, and suppressing deterioration of the transmission efficiency, and while at the same time the adhesive rubber layer is formed to have a weight increase of 90% or less after immersed in light oil for 48 hours at 25° C. or have a weight increase of 80% or less after immersed in toluene for 48 hours at 25° C., thereby reducing dynamic heat build-up during running of the belt and hence reducing separation or pop-out. In comparison with this, according to the V-ribbed belt of the second embodiment the adhesive rubber layer adhered to the core wires is formed to have a storage modulus of not less than 10 MPa and not more than 50 MPa and a tan δ of not more than 0.15 as measured by dynamic viscoelasticity measurement under conditions at a static load of 3 kgf/cm$^2$, a dynamic strain of 0.4%, a frequency of 10 Hz and a temperature of 25° C. in a tensile mode in the belt longitudinal direction, thereby reducing hysteresis loss or the like as compared with the case in which the rubber layer to be adhered to the core wires is formed with a high modulus, and suppressing deterioration of the transmission efficiency, and while at the same time the adhesive rubber layer is formed to have a tan δ of not more than 0.15 as measured by dynamic viscoelasticity measurement under conditions at a static load of 3 kgf/cm$^2$, a dynamic strain of 0.4%, a frequency of 10 Hz and a temperature of 25° C. in a tensile mode in the belt longitudinal direction, thereby reducing dynamic heat build-up and hence reducing occurrence of a problem, such as occurrence of cracks and separation due to the cracks.

In the same manner as in the first embodiment, this adhesive rubber layer of the V-ribbed belt of the second embodiment is also crosslinked by mixing an organic peroxide with a rubber component of the adhesive rubber layer to have effective peroxide groups of the organic peroxide being not less than 0.021 mol or more per 100 g of the rubber component. With this, it is possible to easily form an adhesive rubber layer to have a storage modulus of not less than 10 MPa and not more than 50 MPa as measured by dynamic viscoelasticity measurement under conditions at a static load of 3 kgf/cm$^2$, a dynamic strain of 0.4%, a frequency of 10 Hz and a temperature of 25° C. in a tensile mode in the belt longitudinal direction.

Also, short fibers are contained in the adhesive rubber layer in the amount of 20 parts by weight or less and preferably 1-10 parts by weight per 100 parts by weight of a rubber component of the adhesive rubber layer. With this, it is possible to more easily form an adhesive rubber layer to have a storage modulus of not less than 10 MPa and not more than 50 MPa as measured by dynamic viscoelasticity measurement under conditions at a static load of 3 kgf/cm$^2$, a dynamic strain of 0.4%, a frequency of 10 Hz and a temperature of 25° C. in a tensile mode in the belt longitudinal direction. The V-ribbed belt of the second embodiment is also the same as that of the first embodiment in this point.

The first and second embodiments were described by taking, for example, a case in which the core wires are embedded in the adhesive rubber layer. However, it is within the intended scope of the present invention that any one of the adhesive rubber layer and the compression rubber layer, which is adhered to the core wires, is formed to have a durometer hardness (shore A) of not less than 72 and not more than 85, or have a tensile stress of not less than 0.5 MPa and not more than 1.7 MPa when stretched 10% in the belt longitudinal direction at 25° C., and also the adhesive layer, which is adhered to the core wires, is formed to have a weight increase of 90% or less after immersed in light oil for 48 hours at 25° C. or have a weight increase of 80% or less after immersed in toluene for 48 hours at 25° C., even in a case in which the core wires are adhered to both the adhesive rubber layer and the compression rubber layer and held therebetween, or a case in which the core wires are embedded in a single rubber layer having no separate arrangement of a back-side rubber layer, an adhesive rubber layer and a compression rubber layer.

It is also within the intended scope of the present invention that the rubber layer adhered to the core wires is formed to have a storage modulus of not less than 10 MPa and not more than 50 MPa as measured by dynamic viscoelasticity measurement under conditions at a static load of 3 kgf/cm$^2$, a dynamic strain of 0.4%, a frequency of 10 Hz and a temperature of 25° C. in a tensile mode in the belt longitudinal direction, even in a case in which the core wires are adhered to both the adhesive rubber layer and the compression rubber layer and held therebetween, or a case in which the core wires are embedded in a single rubber layer having no separate arrangement of a back-side rubber layer, an adhesive rubber layer and a compression rubber layer It is also within the intended scope of the present invention that a coating rubber layer prepared by, for example, coating the surface of the core wires, which is adhered to the core wires to coat the same, is made of a rubber composition, which enables the coating rubber layer to be formed to have a durometer hardness (shore A) of not less than 72 and not more than 85, or have a tensile stress of not less than 0.5 MPa and not more than 1.7 MPa when stretched 10% in the belt longitudinal direction at 25° C. and formed to have a weight increase of 90% or less after immersed in light oil for 48 hours at 25° C. or have a weight increase of 80% or less after immersed in toluene for 48 hours at 25° C., or formed to have a storage modulus of not less than 10 MPa and not more than 50 MPa and a tan δ of not more than 0.15 as measured by dynamic viscoelasticity measurement under conditions at a static load of 3 kgf/cm$^2$, a dynamic strain of 0.4%, a frequency of 10 Hz and a temperature of 25° C. in a tensile mode in the belt longitudinal direction.

The first and second embodiments were described by taking, for example, the V-ribbed belt without intention to limit a transmission belt to the V-ribbed belt. A synchronous belt, a V-belt, a flat belt and the like are also within the intended scope of the present invention.

EXAMPLES

Now, the present invention will be described in more detail by citing Examples without intention to limit the present invention thereto.

Examples 1-9

Comparative Examples 1-7

Mixing Ingredients

The mixing ingredients used in Examples and Comparative Examples are shown in Table 1, and core wires used therein are shown in Table 2. For all of the back-side rubber layers and the compression rubber layers of Examples and Comparative Examples, the same ingredients are used. The formulations of the back-side rubber layer and the compression rubber layer are shown in Table 3. The formulations of the adhesive rubber layers of the transmission belts of Examples and the Comparative Examples and core wires used therein are shown in Tables 4 and 5, respectively.

TABLE 1

| Mixing Ingredients | Manufacturers | Trade names |
|---|---|---|
| EPDM1 (ethylene-propylene-diene-terpolymer: diene component DCPD*) | Sumitomo Chemical | ESPRENE 301 |
| EPDM2 (ethylene-propylene-diene-terpolymer: diene component ENB*) | JSR | EP33 |
| Crosslinking Agent 1 (trymethylol propane trimethacrylate) | Seiko Chemical | HICLOTH M |
| Crosslinking Agent 2 (zinc dimethacrylate) | Kawaguchi Chemical Industry | ACTOR TSH |
| Zinc Oxide | Sakai Chemical Industry | ZINC OXIDE 3 TYPES |
| Stearic Acid | New Japan Chemical | STEARIC ACID 50S |
| Age Resistor 1 (polymerized 2,2,4-trimethyl-1,2-dihydroquinoline) | Ouchi Shinko Chemical Industrial | NOCRAC 224 |
| Age Resistor 2 (2-mercaptobenzimidazole) | Ouchi Shinko Chemical Industrial | NOCRAC MB |
| Carbon Black | Tokai Carbon | SEAST SO |
| Silica | Tokuyama | TOKUSIL GU |
| Oil | Kobe Oil Chemical Industrial | SANPAR 2280 |
| Sulfur | Hosoi Chemical Industry | OIL SULFUR |
| Vulcanization Accelerator 1 (tetramethyl thiram monosulfide) | Ouchi Shinko Chemical Industrial | NOXELA-TS |
| Vulcanization Accelerator 2 (2-mercaptobenzothiazole) | Ouchi Shinko Chemical Industrial | NOXELA-M |
| Short Fibers (polyamide) | Asahi Kasei | NYLON 66, TYPE T-5 |
| Organic Peroxide (di-α-cumyl peroxide) | NOF Corporation | PERCUMYL D40 |

*ENB: Ethylidene Norbornene, DCPD: Dicyclopentadiene

TABLE 2

| Core Wires | Materials | Manufacturers | Structure | Twisting Number* Primarily Twisting (times/10 cm)/Final Twisting (times/10 cm) |
|---|---|---|---|---|
| Core Wire 1 | Polyethylene terephthalate | Toray | 1100 dtex/2 × 3 | 16/10 |
| Core Wire 2 | Polyethylene naphthalate | Teijin | 1100 dtex/2 × 3 | 16/10 |
| Core Wire 3 | Aromatic polyamide | Teijin (Trade name: "Technora T-200) | 1100 dtex/2 × 3 | 16/10 |
| Core Wire 4 | 4,6 Nylon | DSM Engineering Plastics | 1100 dtex/2 × 3 | 16/10 |

*Final twisting is Z-twisting and primarily twisting is S-twisting.

TABLE 3

| Mixing Ingredients | Parts by Weight |
|---|---|
| EPDM 1 | 100 |
| Stearic Acid | 0.25 |
| Zink Oxide | 5 |
| Age Resistor 1 | 0.5 |
| Age Resistor 2 | 2 |
| Carbon Black | 60 |
| Oil | 10 |
| Organic Peroxide | 10 |
| Short Fibers | 13 |

TABLE 4

| Mixing Ingredients | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| EPDM1 | | 100 | 100 | 100 | 100 | 100 | 100 | 100 | 100 |
| EPDM2 | 100 | | | | | | | | |
| Crosslinking Agent 1 | 2.5 | 2.5 | 2.5 | 2.5 | 2.5 | 2.5 | 2.5 | 2.5 | 2.5 |
| Crosslinking Agent 2 | | | | | 10 | 10 | 10 | 10 | 10 |
| Zinc Oxide | 5 | 5 | 5 | 5 | 5 | 5 | 5 | 5 | 5 |
| Stearic Acid | 0.25 | 0.25 | 0.25 | 0.25 | 0.25 | 0.25 | 0.25 | 0.25 | 0.25 |
| Age Resistor 1 | 0.5 | 0.5 | 0.5 | 0.5 | 0.5 | 0.5 | 0.5 | 0.5 | 0.5 |

TABLE 4-continued

| Mixing Ingredients | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Age Resistor 2 | 2 | 2 | 2 | 2 | 2 | 2 | 2 | 2 | 2 |
| Short Fibers | | | | | | 4 | 4 | 4 | 4 |
| Carbon Black | 60 | 60 | 60 | 60 | 60 | 60 | 60 | 60 | 60 |
| Oil | 12 | 12 | 12 | 12 | 12 | 12 | 12 | 12 | 12 |
| Organic Peroxide | 14.2 | 14.2 | 18.75 | 25 | 25 | 25 | 25 | 25 | 25 |
| Core Wires | Core Wire 1 | Core Wire 1 | Core Wire 1 | Core Wire 1 | Core Wire 1 | Core Wire 1 | Core Wire 2 | Core Wire 3 | Core Wire 4 |

*The unit of numerical values in Table is parts by weight.

TABLE 5

| Mixing Ingredients | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| EPDM 1 | 100 | 100 | 100 | 100 | 100 | 100 | 100 |
| Crosslinking Agent 1 | | 2.5 | 2.5 | | | | |
| Crosslinking Agent 2 | | | | 20 | | | |
| Zinc Oxide | 5 | 5 | 5 | 5 | 5 | 5 | 5 |
| Stearic Acid | 1 | 0.25 | 0.25 | 1 | 1 | 1 | 1 |
| Age Resistor 1 | | 0.5 | 0.5 | | | | |
| Age Resistor 2 | | 2 | 2 | | | | |
| Short Fibers | 4 | | | | 4 | 4 | 4 |
| Carbon Black | 65 | 60 | 60 | | 65 | 65 | 65 |
| Silica | 20 | | | 65 | 20 | 20 | 20 |
| Oil | 12 | 12 | 12 | | 12 | 12 | 12 |
| Sulfur | 3 | | 0.5 | | 3 | 3 | 3 |
| Vulcanization Accelerator 1 | 1 | | | | 1 | 1 | 1 |
| Vulcanization Accelerator 2 | 0.5 | | | | 0.5 | 0.5 | 0.5 |
| Organic Peroxide | | 7.5 | 7.5 | 6 | | | |
| Core Wires | Core Wire 1 | Core Wire 1 | Core Wire 1 | Core Wire 1 | Core Wire 2 | Core Wire 3 | Core Wire 4 |

*The unit of numerical values in Table is parts by weight.

Physical Characteristics Evaluation

Preparation of Sheets for Physical Characteristics Evaluation

Ingredients are first mixed together according to the formulation of the adhesive rubber layer for use in a transmission belt of each of Examples 1-6 (Examples 7 and 9 each have the same formulation as that of Example 6) and Comparative Examples 1-4 (Comparative Examples 5-7 each have the same formulation as that of Comparative Example 1), then kneaded by a Banbury mixer, and then formed into an unvulcanized sheet having a thickness of 0.4 mm by a calendar roll. Then, six unvulcanized sheets thus prepared are overlapped together and heat-pressed at 170° C. for 20 minutes. Thus, a sheet having a thickness of about 2.2 mm for tear strength test and tensile test evaluation is prepared.

Similarly, three unvulcanized sheets having a thickness of 0.4 mm are overlapped together and heat pressed at 170° C. for 20 minutes. Thus, a sheet having a thickness of about 1.1 mm for viscoelastic modulus evaluation is prepared.

Physical Characteristics Evaluation

Tear Strength Test

A Tear Strength Specimen is Cut from Each of the Physical Characteristics evaluation sheets in order to conduct a tear strength test in the calendar grain direction according to JIS K 6252, and a tear strength test is conducted for each piece in a crescent shape.

The measured results of the tensile force and elongation are shown in Table 6.

Tensile Test

A JIS No. 3 dumbbell specimen is cut out from each of the respective physical characteristics evaluation sheets in the calendar grain direction and a tensile test is conducted according to JIS K 6251.

The items to be measured are 10% modulus ($M_{10}$), 20% modulus ($M_{20}$), 50% modulus ($M_{50}$), 100% modulus ($M_{100}$), tensile rupture elongation (EB), and tensile rupture stress (TB). The results are shown in Table 6.

Viscoelastic Modulus Evaluation

The storage modulus (E') and tan δ of each of the respective viscoelastic modulus evaluation sheets are measured under conditions at a static load of 3 kgf/cm$^2$, a dynamic strain of 0.4%, a frequency of 10 Hz and a temperature of 25° C. in a tensile mode in the calendar grain direction. Similarly, they are measured at 80° C., 100° C., 130° C. and 150° C., respectively. For measuring, Rheometrics RSA II viscoelasticity measuring apparatus is used. The results are shown in Table 6.

Effective Peroxide Groups Per 100 g of a Rubber Component

The effective peroxide groups per 100 g of a rubber component of the adhesive rubber layer is calculated from the formulations of Tables 4 and 5. First, the purity of each of the organic peroxides (dicumylperoxide) used in the formulations of Tables 4 and 5 was investigated and found to be 40%. The molecular weight of dicumylperoxide is 270.38 (g/mol) and a single effective peroxide group exists in one molecule. Therefore, the effective peroxide groups per 100 g of a rubber component are determined by the following formula, in which the quantity thereof per 100 g of a rubber component in each of Tables 4 and 5 is designated as X(g).

Effective peroxide groups (mol) per 100 g of a rubber component=$X \times 0.4 \times 1/270.38$ For the formulations of the adhesive rubber layers of Examples 16, and Comparative Examples 14, the number of effective peroxide groups per 100 g of a rubber component is determined. The results are shown in Table 6.

into an unvulcanized sheet for compression rubber layer (thickness: 0.8 mm), an unvulcanized sheet for adhesive rubber layer (thickness: 0.4 mm) and an unvulcanized sheet for back-side rubber sheet (thickness of 0.6 mm) by a calendar roll.

Then, 1 ply of the unvulcanized sheet for back-side rubber layer is wound around a cylindrical molding drum, then 1 ply of the unvulcanized sheet for adhesive rubber layer is wound therearound, then core wires are spirally spun therearound, then again 1 ply of the unvulcanized sheet for adhesive rubber layer is wound therearound, then 4 plies of the unvulcanized sheet for compression rubber layer are wound therearound. Thus, a laminate body of the unvulcanized sheets are prepared.

When the above laminate body of the unvulcanized sheets is prepared, the unvulcanized sheet for compression rubber layer and the unvulcanized sheet for back-side rubber layer are wound around the cylindrical molding drum so that the width direction of the transmission belt becomes the calendar grain direction, and the unvulcanized sheet for adhesive rub-

TABLE 6

| Measuring Items | | Ex. 1 | Ex. 2 | Ex. 3 | Ex. 4 | Ex. 5 | Exs. 6-9 | Comp. Exs. 1, 5-7 | Comp. Ex. 2 | Comp. Ex. 3 | Comp. Ex. 4 |
|---|---|---|---|---|---|---|---|---|---|---|---|
| Hardness | | 73 | 72 | 72 | 75 | 80 | 82 | 78 | 71 | 70 | 91 |
| Tear Test | Tearing Force (N) | 16.0 | 17.6 | 13.1 | 9.6 | 12.0 | 16.3 | 46.5 | 23.6 | 32.5 | 37.5 |
| | Elongation (%) | 28.3 | 33.4 | 24.7 | 18.3 | 14.5 | 13.5 | 103.0 | 59.4 | 84.4 | 18.0 |
| Tensile Test | $M_{10}$ (MPa) | 0.71 | 0.60 | 0.62 | 0.65 | 1.02 | 1.50 | 1.26 | 0.59 | 0.61 | 3.51 |
| | $M_{20}$ (MPa) | 1.36 | 1.21 | 1.22 | 1.33 | 2.25 | 2.90 | 2.26 | 1.07 | 1.06 | 4.63 |
| | $M_{50}$ (MPa) | 3.09 | 2.68 | 2.88 | 3.66 | 6.92 | 7.10 | 3.30 | 2.07 | 1.88 | 13.40 |
| | $M_{100}$ (MPa) | 8.60 | 7.64 | 8.88 | 11.9 | 19.6 | 18.5 | 4.31 | 3.73 | — | |
| | TB (MPa) | 21.4 | 20.6 | 18.4 | 17.9 | 20.1 | 18.9 | 12.1 | 20.2 | 18.4 | 19.5 |
| | EB (%) | 189 | 208 | 176 | 140 | 116 | 104 | 467 | 304 | 407 | 92 |
| Dynamic Viscoelasticity Test | E' (MPa: 25° C.) | 14.5 | 12.6 | 13.4 | 13.2 | 16.4 | 36.5 | 36.7 | 12.0 | 12.9 | 74.5 |
| | E' (MPa: 80° C.) | 11.6 | 10.3 | 11.9 | 12.5 | 16.8 | 30.3 | 21.7 | 8.8 | 9.0 | 67.0 |
| | E' (MPa: 100° C.) | 11.5 | 10.2 | 12.0 | 12.8 | 17.5 | 28.6 | 18.9 | 8.5 | 8.7 | 63.4 |
| | E' (MPa: 130° C.) | 11.6 | 10.4 | 12.4 | 13.4 | 18.6 | 28.4 | 16.3 | 8.3 | 8.6 | 62.5 |
| | E' (MPa: 150° C.) | 11.9 | 10.6 | 12.7 | 13.8 | 19.4 | 27.6 | 15.4 | 8.3 | 8.7 | 63.2 |
| | tan δ (—: 25° C.) | 0.1622 | 0.1447 | 0.1356 | 0.1247 | 0.0817 | 0.0850 | 0.2693 | 0.1667 | 0.1996 | 0.0947 |
| | tan δ (—: 80° C.) | 0.1134 | 0.1052 | 0.1064 | 0.0828 | 0.0535 | 0.0589 | 0.2525 | 0.1396 | 0.1692 | 0.0871 |
| | tan δ (—: 100° C.) | 0.0969 | 0.0913 | 0.0916 | 0.0700 | 0.0489 | 0.0501 | 0.2410 | 0.1259 | 0.1491 | 0.0824 |
| | tan δ (—: 130° C.) | 0.0811 | 0.0780 | 0.0767 | 0.0575 | 0.0431 | 0.0489 | 0.2192 | 0.1114 | 0.1299 | 0.0777 |
| | tan δ (—: 150° C.) | 0.0723 | 0.0706 | 0.0680 | 0.0507 | 0.0391 | 0.0423 | 0.2007 | 0.1018 | 0.1189 | 0.0731 |
| Weight Increase After Toluene Immersion (%) | | 72 | 77 | 71 | 64 | 52 | 44 | 81 | 89 | 100 | 51 |
| Weight Increase After Light Oil Immersion (%) | | 86 | 90 | 85 | 74 | 58 | 48 | 99 | 103 | 110 | 59 |
| Effective Peroxide Groups per 100 g of Rubber Component (mol) | | 0.0210 | 0.0210 | 0.0277 | 0.0370 | 0.0370 | 0.0370 | — | 0.0111 | 0.0111 | 0.0089 |

Evaluation of Transmission Belt

Manufacturing of Transmission Belt

Ingredients are first mixed according to the formulation of the compression rubber layer, the adhesive rubber layer and the back-side rubber layer of each of Examples and Comparative Examples, then kneaded by a Banbury mixer, and formed ber layer is wound around the cylindrical molding drum so that the longitudinal direction (circumferential direction) of the transmission belt becomes the calendar grain direction.

The core wires as used are subjected to a resorcin-formaldehyde-latex (RFL) treatment.

This RFL treatment is carried out by baking an RFL treatment solution using 2,3-dichlolobutadiene on core wires twice, which core wires have been pretreated by a isocyanate-based pretreating agent, following a conventional technique.

Then, this unvulcanized laminate body is vulcanized in a vulcanizing pan, and is removed from the molding to form a cylindrical premold. Then, rib shapes are formed on the surface of this cylindrical premold by using a grind stone, then a V-ribbed belt is cut out from this cylindrical premold with a width corresponding to three ribs, having substantially the same cross sectional shape as that of FIG. 1.

The total thickness of this V-ribbed belt (h1 in FIG. 1) is 4.3 mm and the rib height (h2 in FIG. 1) is 2.0 mm and the belt pitch circumferential length is 1100 mm.

[Measuring of Hardness]

A portion of an adhesive rubber layer having a thickness of about 0.1 mm is cut out from a transmission belt of each of Examples and Comparative Examples manufactured in the above manner, and 20 specimens having a thickness of 0.1 mm thus cut out are stacked together and the durometer hardness is measured by using a type-A durometer. The results are shown in Table 6.

Weight Increase Test after Toluene Immersion

Weight Increase after Toluene Immersion

A portion of the adhesive rubber layer having a thickness of about 0.1 mm is cut out from a transmission belt of each of Examples and Comparative Examples, and this specimen as cut out is treated to have a total weight of about 50 mg, and then an initial weight ($M_0$) thereof is weighed by an electronic chemical balance having a minimum measuring unit of about 0.1 mg. Then, this specimen is surrounded by brass mesh having an opening size of 50 μm and immersed in toluene at 25° C. for 48 hours. After immersion for 48 hours, the specimen along with the brass mesh is taken out then the specimen is brought out from this brass mesh onto a filter paper, and then is left for 30 minutes under an environment at a temperature of 23±2° C. and a relative humidity of 60±5%. Then, the specimen is weighed by an electronic chemical balance, thereby measuring the weight ($M_1$) of the specimen after toluene immersion.

The weight increase rate (ΔM) after toluene immersion is calculated by the following formula from the measured value.

$$\Delta M(\%) = (M_1 - M_0)/M_0 \times 100$$

This weight increase rate is measured for 5 specimens of each of Examples and Comparative Examples. The intermediate values thereof are shown in Table 6.

Weight Increase after Light Oil Immersion

The evaluation is made in the same manner as for the weight increase after toluene immersion except that light oil is used in place of toluene, and the weight increase after light oil immersion is measured by the same calculation formula. The results are shown in Table 6.

Adhesion Durability Test

Figure 2:
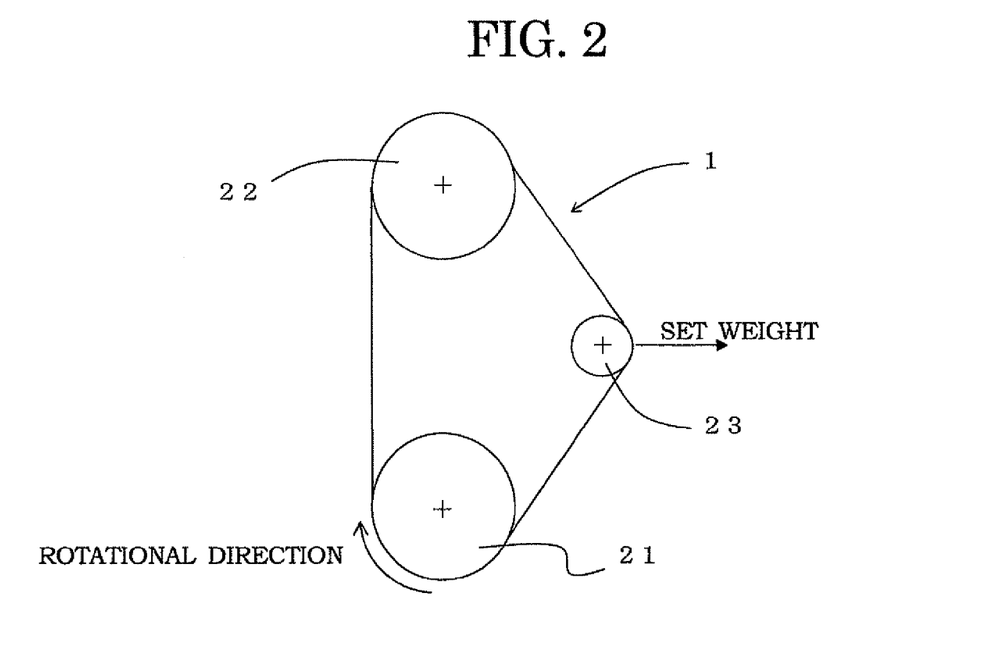
FIG. 2 is a schematic view illustrating a test method of an adhesion durability test.

An adhesion durability test is conducted by winding a V-ribbed belt of each of Examples and Comparative Examples thus prepared around three pulley, as illustrated in FIG. 2. Specifically, a driving pulley 21 having a diameter of 120 mm, a driven pulley 22 having a diameter of 120 mm and an idler pulley 23 having a diameter of 40 mm are used, in which a load of 12 ps (about 8.8 kW) is applied to the driven pulley 22 and a set weight of 834 N is applied to the idler pulley 23 in the direction of an arrow in FIG. 2, while at the same time the driving pulley 21 is rotated at 4900 rpm. With this arrangement, the transmission belt 1 is operated in an atmosphere of 90±20° and the temperature of the back side of the transmission belt is measured in 50 hours. The results are shown in Table 7.

The time until the total length of a separation, which has taken place between the core wires and the adhesive rubber layer (when plural separations take place, the total length of the separations) reaches 50 mm is measured as an adhesiveness endurance time. The results are shown in Table 7.

TABLE 7

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| Adhesiveness Endurance Time (h) | 105 | 140 | 155 | 170 | 197 | 254 | 310 | 350 | 210 |
| Back Side Temp. After 50 h (° C.) | 134 | 128 | 124 | 120 | 118 | 125 | 122 | 120 | 129 |

|  | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- |
| Adhesiveness Endurance Time (h) | 73 | 25 | 16 | 56 | 80 | 85 | 60 |
| Back Side Temp. After 50 h (° C.) | 141 | 138 | 140 | 148 | 140 | 139 | 145 |

From the results of Table 7, it is found that Examples 1-9 have excellent adhesive durability.

Also, it is found that dynamic heat build-up is reduced in Examples 1-9.

Contrarily, it is found that the adhesive durability of the transmission belt of Comparative Example 1 is lower than that of the transmission belt of Example 1.

Especially, the transmission belts of Comparative Examples 2 and 3, in which the values in such as the weight increase after toluene immersion and the weight increase after light oil immersion are greater than those of Examples, have an adhesive durability lower than that of the transmission belts of Examples.

Furthermore, Comparative Example 4, which corresponds to the case in which an adhesive rubber layer is formed by using a rubber having high modulus at a high temperature, as described in Patent Document 4, has large dynamic heat build-up as compared with the transmission belts of Examples and consequently has deteriorated adhesive durability.

Compared between Example 5 and Examples 6-9, it is found that containing short fibers in an adhesive rubber layer to be adhered to core wires can make adhesive durability more excellent.

Compared between Example 1 and Example 2, it is found that using, as a diene component, ethylene-propylene-diene-terpolymer, which contains dicyclopentadiene, can make adhesive durability more excellent.

From the above results, it is found that the transmission belt of the present invention can suppress deterioration of the transmission efficiency and have improve durability.

The invention claimed is:

1. A transmission belt that includes a rubber layer that has ethylene-α-olefin elastomer used as a base rubber and extends in a belt longitudinal direction, and core wires adhered to the rubber layer and embedded therein in the belt longitudinal direction, wherein the rubber layer adhered to the core wires is formed to have a storage modulus of not less than 10 MPa and not more than 50 MPa and a tan δ of not more than 0.15 as measured by dynamic viscoelasticity measurement under conditions at a static load of 3 kgf/cm$^2$, a dynamic strain of 0.4%, a frequency of 10 Hz and a temperature of 25° C. in a tensile mode in a belt longitudinal direction, wherein ethylene-propylene-diene-terpolymer, which contains dicyclopentadiene as a diene component, is used for the ethylene-α-olefin elastomer.

2. The transmission belt according to claim 1 wherein the rubber layer adhered to the core wires contains short fibers.

3. The transmission belt according to claim 2, wherein the short fibers are contained in the rubber layer in the amount of 1-15 parts by weight per 100 parts by weight of a rubber component contained in the rubber layer.

4. The transmission belt according to claim 1, wherein the rubber layer adhered to the core wires is crosslinked by an organic peroxide, and the organic peroxide is mixed with a rubber component used in the rubber layer and crosslinked with the same to have effective peroxide groups of the organic peroxide being not less than 0.021 mol per 100 g of the rubber component.

* * * * *